(12) United States Patent
Dhuyvetter et al.

(10) Patent No.: US 8,754,616 B2
(45) Date of Patent: Jun. 17, 2014

(54) BOOST CONVERTER WITH MULTI-MODE SYNCHRONOUS RECTIFIER

(75) Inventors: Timothy Alan Dhuyvetter, Arnold, CA (US); Norbert James Hepfinger, Candia, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 349 days.

(21) Appl. No.: 13/287,608

(22) Filed: Nov. 2, 2011

(65) Prior Publication Data

US 2012/0206124 A1 Aug. 16, 2012

Related U.S. Application Data

(60) Provisional application No. 61/441,727, filed on Feb. 11, 2011.

(51) Int. Cl.
*G05F 1/618* (2006.01)

(52) U.S. Cl.
USPC .............................. 323/222; 323/271; 323/285

(58) Field of Classification Search
CPC ........... G05F 1/565; G05F 1/59; G05F 1/618; G05F 1/62
USPC .................. 323/222, 271, 282, 284, 285, 299
See application file for complete search history.

(56) References Cited

U.S. PATENT DOCUMENTS

| | | | |
|---|---|---|---|
| 6,717,388 B2 * | 4/2004 | Smidt et al. .................... | 323/271 |
| 7,242,168 B2 * | 7/2007 | Muller et al. .................. | 323/222 |
| 7,518,345 B2 * | 4/2009 | Messager ....................... | 323/222 |
| 8,415,933 B2 * | 4/2013 | Loikkanen et al. ............ | 323/225 |
| 8,476,878 B2 * | 7/2013 | Hoon et al. .................... | 323/271 |
| 2007/0236199 A1 | 10/2007 | Nakata | |
| 2007/0273347 A1 | 11/2007 | Chuang et al. | |
| 2012/0206124 A1 * | 8/2012 | Dhuyvetter et al. ........... | 323/317 |

FOREIGN PATENT DOCUMENTS

| | | |
|---|---|---|
| CN | 101142736 A | 3/2008 |
| EP | 1821386 A2 | 8/2007 |

OTHER PUBLICATIONS

Chinese Application Serial No. 201210031784.5, Office Action mailed Jan. 21, 2014, 15 pgs.

* cited by examiner

*Primary Examiner* — Jeffrey Sterrett
(74) *Attorney, Agent, or Firm* — Schwegman, Lungberg & Woessner, P.A.

(57) ABSTRACT

This document discusses methods and apparatus for converting an input voltage level to an output voltage level that can be different from the input voltage level. In an example, a converter can include a first switch configured to couple an inductor to a load, a second switch configured to initiate current flow in the inductor, a third switch coupled to a current source, and a controller configured to couple the first switch to the third switch to form a current mirror, to conduct current between the inductor and the load using the first switch, and to control the conducted current using the current source when an output voltage is substantially less than the supply voltage.

18 Claims, 6 Drawing Sheets

BOOST CONVERTER WITH MULTI-MODE SYNCHRONOUS RECTIFIER

CLAIM OF PRIORITY

This patent application claims the benefit of priority, under 35 U.S.C. Section 119(e), to Dhuyvetter et al., U.S. Provisional Patent Application Ser. No. 61/441,727, entitled "BOOST CONVERTER WITH MULTI-MODE SYNCHRONOUS RECTIFIER," filed on Feb. 11, 2011, which is hereby incorporated by reference herein in its entirety.

BACKGROUND

Electronic devices can use power management system to convert, rectify and deliver power for various subcomponents of the system. For example, a boost converter can provide output power that can have a higher voltage than a supply to the boost converter. Boost converters can provide power to a number of electronic subcomponents including, but not limited to, components of mobile electronic devices, audio integrated circuits, and boosted class D integrated circuits.

Overview

This document generally relates to converting an input voltage level to an output voltage level that can be different from the input voltage level, and more particularly to modes of operation to convert between the voltages more efficiently. In an example, a converter can include a first switch configured to couple an inductor to a load, a second switch configured to initiate current flow in the inductor, a third switch coupled to a current source, and a controller configured to couple the first switch to the third switch to form a current mirror, to conduct current between the inductor and the load using the first switch, and to control the conducted current using the current source when an output voltage is substantially less than the supply voltage.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, a power management system that can supply in a high-efficient manner, dynamically controlled power over a wide range of input supply voltages and output loads. In certain examples, the power management system can include a synchronously rectified boost converter (SRBC), which uses a current source mode during startup to control battery inrush current. During normal operation, the SRBC can either provide the input battery voltage or a stepped up regulated voltage to the converter output depending on the load requirements. In an example, an SRBC can include an inductor that can receive a supply voltage from a supply. A first switch can conduct current between a load and the inductor, and a second switch can initiate the current flow in the inductor. In certain examples, the SRBC can provide four distinct modes of operation vs. two modes of operation in a typical boost converter.

In an example, in a shutdown mode, or power off mode, the SRBC can isolate the input battery voltage from the converter output, allowing the converter output to remain at a reference potential, such as 0V for example, thus, drawing no current from the battery when the input voltage is applied to the converter.

In an example, during a start up mode, the SRBC can be configured as a current source. As a current source, the SRBC can charge the output capacitor up to the input battery voltage while limiting in-rush current from the battery to a predefined value.

In an example, during low power load conditions, the SRBC can provide high efficiency by turning on the synchronous rectifier portion of the SRBC, such as a PMOS synchronous rectifier, to directly pass the input battery voltage to the converter output thereby eliminating switching losses associated with the output stage of the SRBC.

In an example, during higher power load conditions, the SRBC can maintain high efficiency by minimizing conduction losses in the body diode of the power devices of the synchronous rectifier.

Figure 1:
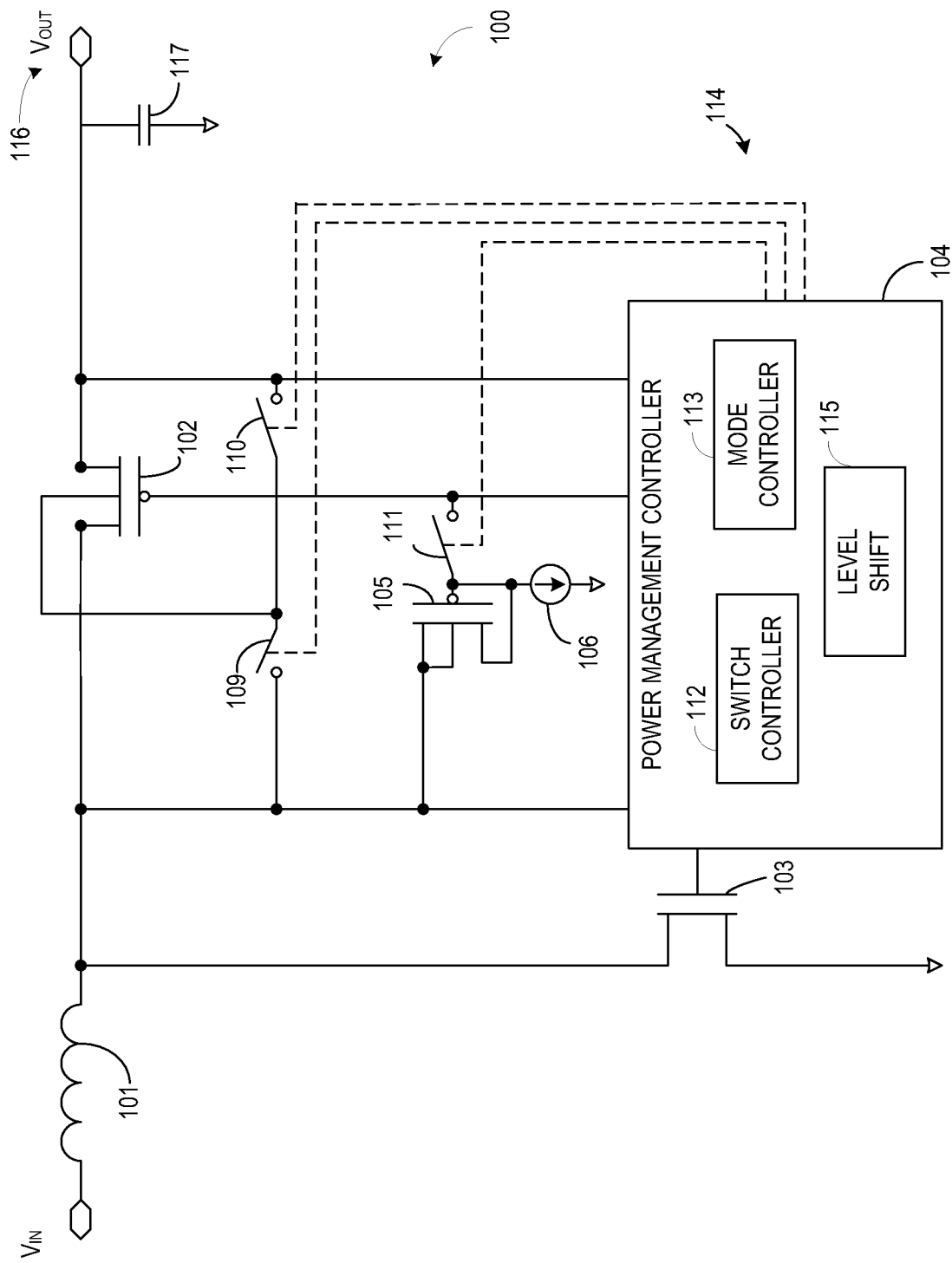
FIG. 1 illustrates generally an example synchronously rectified boost converter (SRBC) system 100.

FIG. 1 illustrates generally a SRBC system 100 including an inductor 101, a first power switch 102, a second power switch 103, a power management controller 104, a startup transistor 105, a startup current source 106, a converter output 116, an output capacitor 117, and a plurality of mode control switches 109, 110, 111.

In general, the first and second power switches 102, 103 can control current of the inductor 101 to convert an input supply power, having a voltage $V_{IN}$ to an output supply power, having a voltage, $V_{OUT}$. A switch controller 112 can control the first and second power switches 102, 103 to convert the power. In an example, the first power switch 102 can include a PMOS device, such as a PMOS transistor. In an example, the second power switch 103 can include a NMOS device, such as an NMOS transistor. In certain examples, the switch controller 112 can provide control signals to the gates of the first and second power switch 102, 103 to convert the input supply power, having voltage $V_{IN}$, to an output supply power, having voltage $V_{OUT}$.

A mode controller 113 can provide signals 114 to control the operation of the SRBC system 100 during various intervals of time outside the general operation of the SRBC system 100. Examples of modes the mode controller 113 can provide include an isolation mode when the SRBC system 100 is disabled, a startup mode when the SRBC system is first enabled and the output supply voltage $V_{OUT}$ is substantially less than the input supply voltage $V_{IN}$, and a pass-thru mode when the input supply voltage $V_{IN}$ is at about the same level as a desired output supply voltage $V_{OUT}$.

During start-up, the output supply power voltage $V_{OUT}$ can begin near ground and then increase above $V_{IN}$. A level shift circuit 115 can monitor the difference between the input supply power voltage $V_{IN}$ and the output supply power voltage $V_{OUT}$, and shift a level of the control signal to the first power switch 102 such that the first power switch 102 operates consistently through the full voltage increase of the output supply power voltage $V_{OUT}$.

In an example, the first and second power switches 102, 103 can include metal-oxide field effect transistors (MOS-FETs). In certain examples, the first power switch 102 can be a p-type MOSFET and the second power switch 103 can be an n-type MOSFET. It is understood that other types of power switches are possible for forming a synchronously rectified boost converter without departing from the scope of the present subject matter.

Figure 2A:
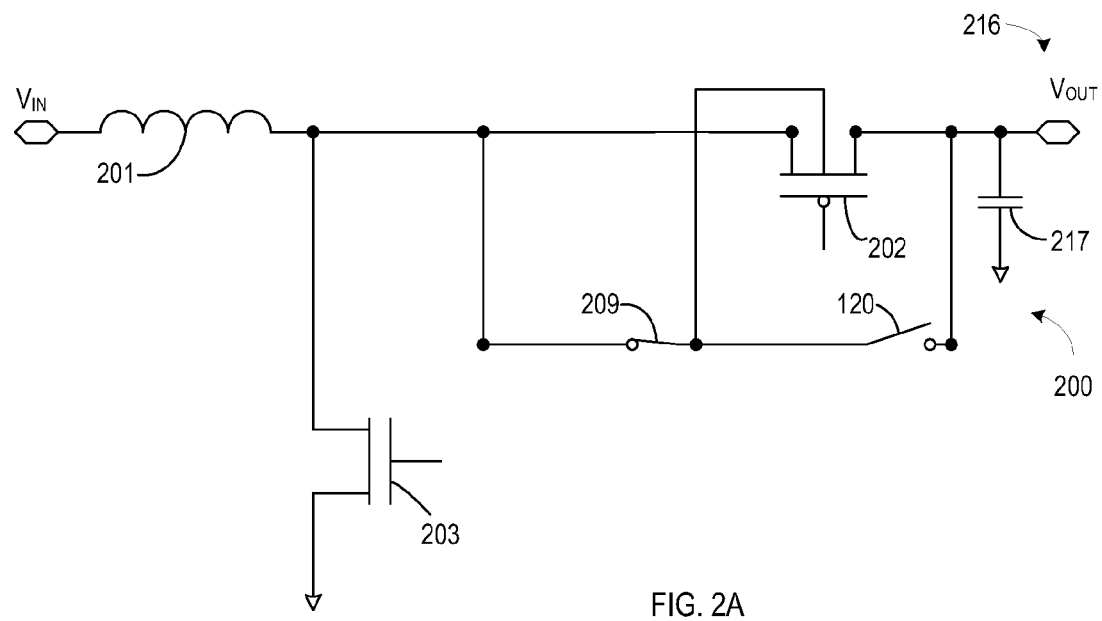
FIG. 2A and FIG. 2B illustrate generally an example of a synchronous boost rectifier system in a power-off, isolation, or shutdown mode of operation.
Figure 2B:
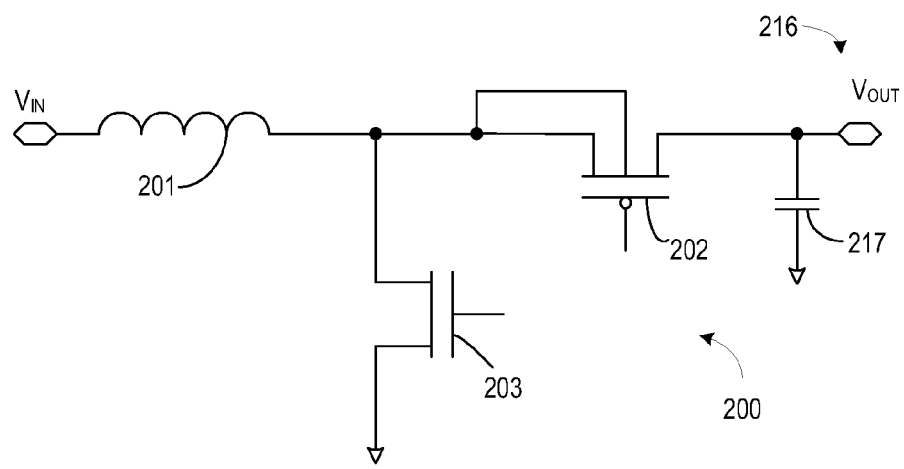

FIGS. 2A and 2B illustrate generally an example of a synchronous boost rectifier system 200, such as the example of FIG. 1, in a power-off, isolation, or shutdown mode of operation. Compared to the example of FIG. 1, FIG. 2A does not show one or more of the circuit devices including the power management controller and the control signals for the mode switches. FIG. 2B further simplifies the synchronous boost rectifier system 200 by not showing the mode switches 209, 210.

The synchronous boost rectifier system 200 can include an inductor 201, a first power switch 202, a second power switch 203, a converter output 216, an output capacitor 217, and a plurality of mode control switches 209, 210. In an example, the synchronous boost rectifier system 200 can be shut down with an input battery voltage applied to the system 200, such as at the input node $V_{IN}$. The switch controller (not shown) can control the gate of the first power switch 202 and the second power switch 203 such that the switches are "off". An "off" switch can be characterized by a relatively high impedance across the switch terminals compared to a relatively low impedance across the switched terminals of an "on" switch. A first mode switch 209 can be closed to couple the bulk of the first transistor power switch 202 to the inductor 201. A second mode switch 210 can be open to isolate the converter output 216 from the bulk of the first transistor power switch 202. In an isolation mode, useful lifetime of a limited power source, such as a battery, can be extended because the converter output 216 can remain at 0 volts, thus, drawing no current from the converter input voltage $V_{IN}$. In an example, the bulk of the first transistor power switch 202 can be tied to the input supply voltage $V_{IN}$ through the inductor 201 to prevent body diode conduction of the input supply power to the converter output 217.

Figure 3A:
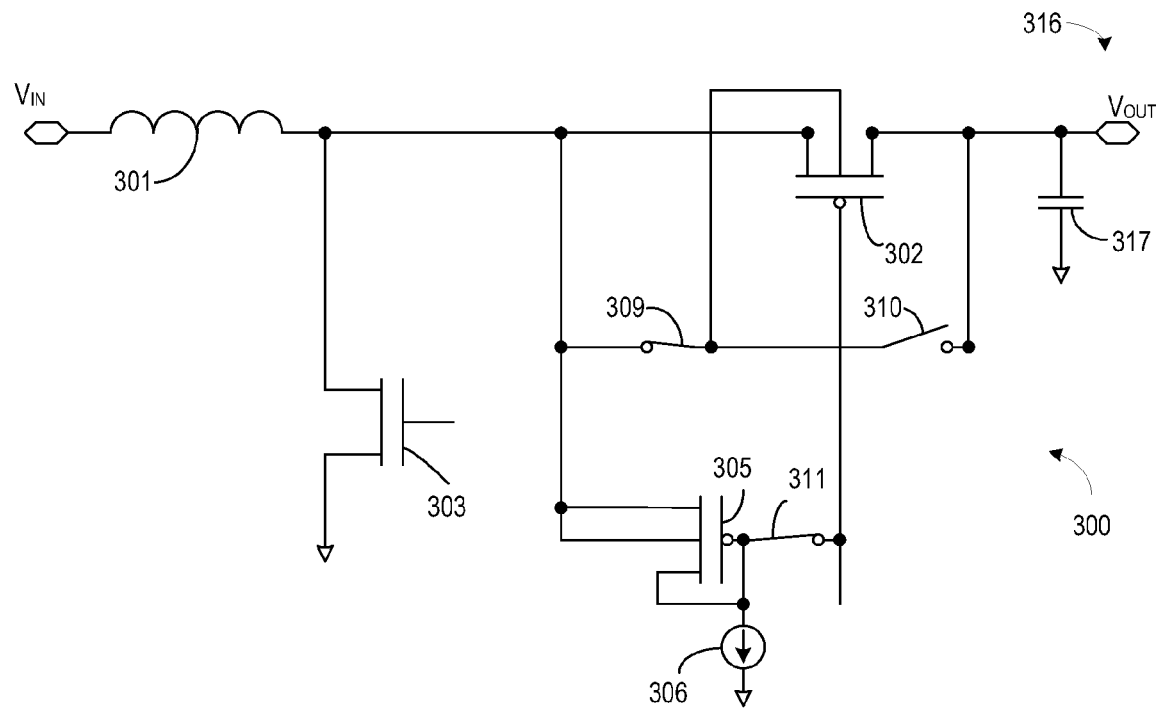
FIG. 3A and FIG. 3B illustrate generally an example of a synchronous boost rectifier system in a start-up mode of operation.
Figure 3B:
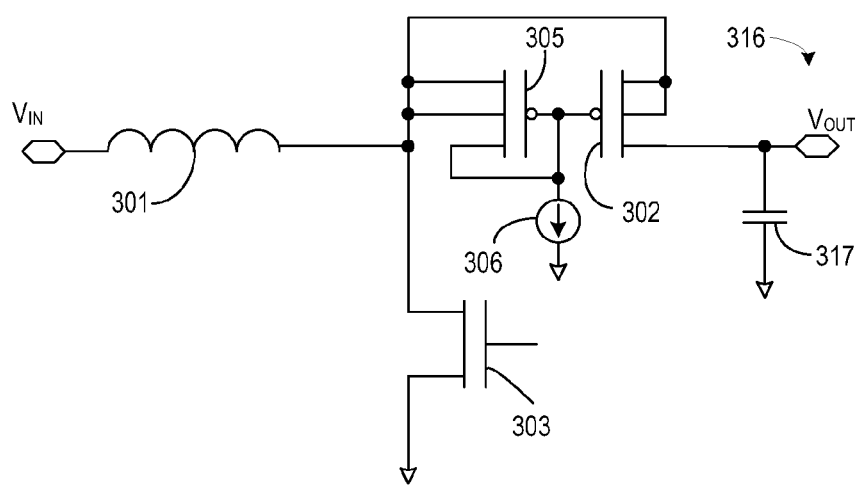

FIGS. 3A and 3B illustrate generally an example of a synchronous boost rectifier system 300 in a start up mode of operation. Compared to the example of FIG. 1, FIG. 3A does not show one or more of the circuit devices including the power management controller and the control signals for the mode switches. FIG. 3B further simplifies the synchronous boost rectifier system 300 by not showing the mode switches 309, 310, 311.

The synchronous boost rectifier system 300 can include an inductor 301, a first power switch 302, a second power switch 303, a startup transistor 305, a startup current source 306, a converter output 316, an output capacitor 317, and a plurality of mode control switches 309, 310, 311. In an example of a start-up mode, the first power switch 302 can be configured as a current source and a second power switch 303 can be in an "off" state. In an example, a first mode switch 309 can couple a bulk of the first power switch to the inductor 201, and a second mode switch 310 can isolate the bulk from the converter output 316. In an example, the first power switch 302 can include a PMOS transistor and a third mode switch 311 can couple a start-up transistor 305 with the first power switch 302 to form a current mirror.

During start-up mode operation, the current source configuration of the first power switch 302 can allow the output voltage $V_{OUT}$' to charge up to the input voltage $V_{IN}$ while limiting the inrush current from an input power source, such as a battery. Limiting inrush current can minimize voltage droop of the supply power source during startup. In an example, a start-up current source 306 can set an inrush current limit. In an example, the start-up current source 306 can be programmable. In an example, the bulk of the first power switch 302 can be tied to $V_{IN}$ through the inductor during at least a portion of a start-up mode to prevent body diode conduction to the converter output 316. In certain examples, an integrated circuit chip can include the first power switch 302, the second power switch 303, the startup transistor 305, the startup current source 306, and the controller. In some examples, an integrated circuit chip can also include the mode control switches 309, 310, 311. In an example, the mode control switches 309, 310, 311 can include transistor switches, such as MOS transistor switches.

Figure 4A:
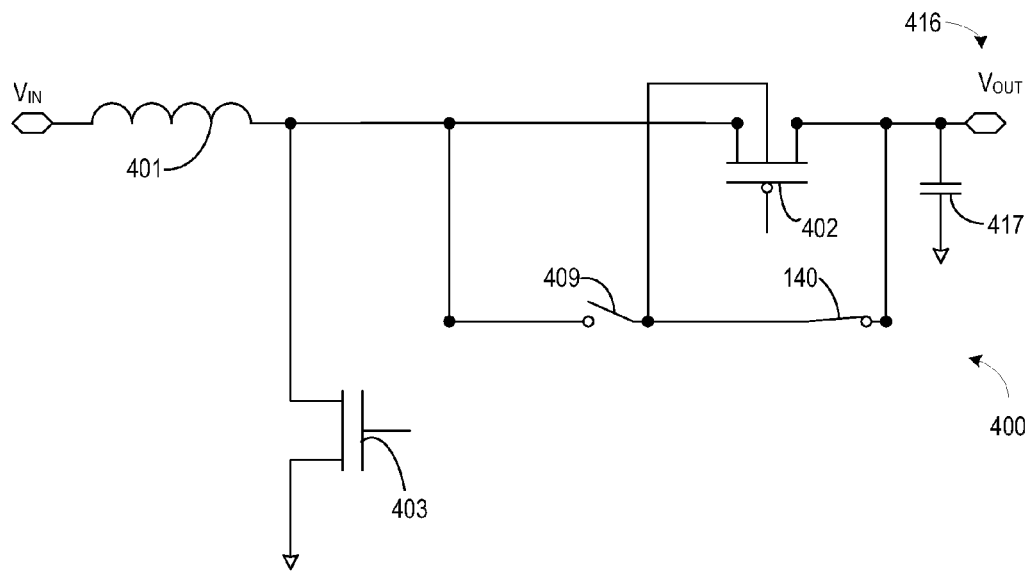
FIG. 4A and FIG. 4B illustrate generally an example of a synchronous boost rectifier system configured to operate in a pass-thru mode of operation.
Figure 4B:
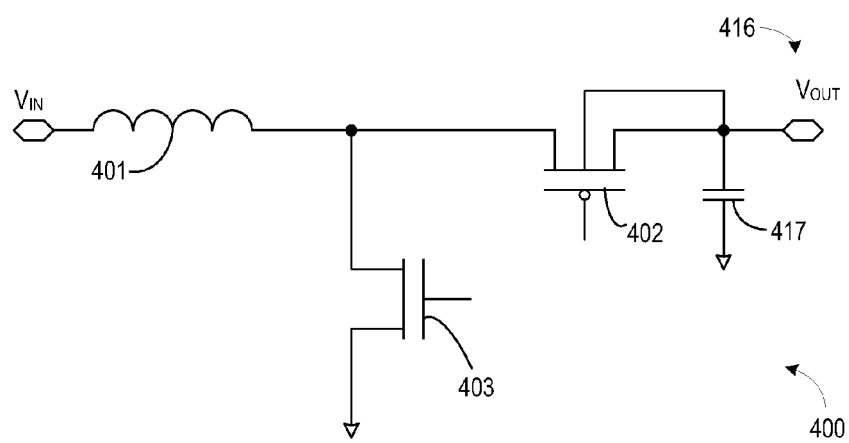

FIGS. 4A and 4B illustrate generally an example of a synchronous boost rectifier system 400 configured to operate in a pass-thru mode of operation. Compared to the example of FIG. 1, FIG. 4A does not show one or more of the circuit devices including the power management controller and the control signals for the mode switches. FIG. 4B further simplifies the synchronous boost rectifier system 400 by not showing the mode switches 409, 410. The synchronous boost rectifier system 400 can include an inductor 401, a first power switch 402, a second power switch 403, a converter output 416, an output capacitor 417, and a plurality of mode control switches 409, 410.

In certain examples, the pass-thru mode of operation can be used when the input supply voltage, $V_{IN}$, is at or near a desired output voltage, $V_{OUT}$ of the converter 400. In an example, first and second mode switches 409, 410 can couple and decouple the bulk of the first power transistor. In certain examples, during a pass-thru mode of operation, the bulk of the first power switch 402 can be coupled to the output voltage $V_{OUT}$. With the first power switch "on" and the second power switch "off", the supply voltage, such as battery voltage, can be passed through directly to the converter output 416 through the inductor 401. Under light load conditions, a pass-thru mode can provide very high efficiency by eliminating the switching losses of the power switches. If $V_{OUT}$ is already charged up to $V_{IN}$, this configuration of the first and second power switches 402, 403 can provide a highly efficient method of power transfer between a battery and the load, for example.

Figure 5:
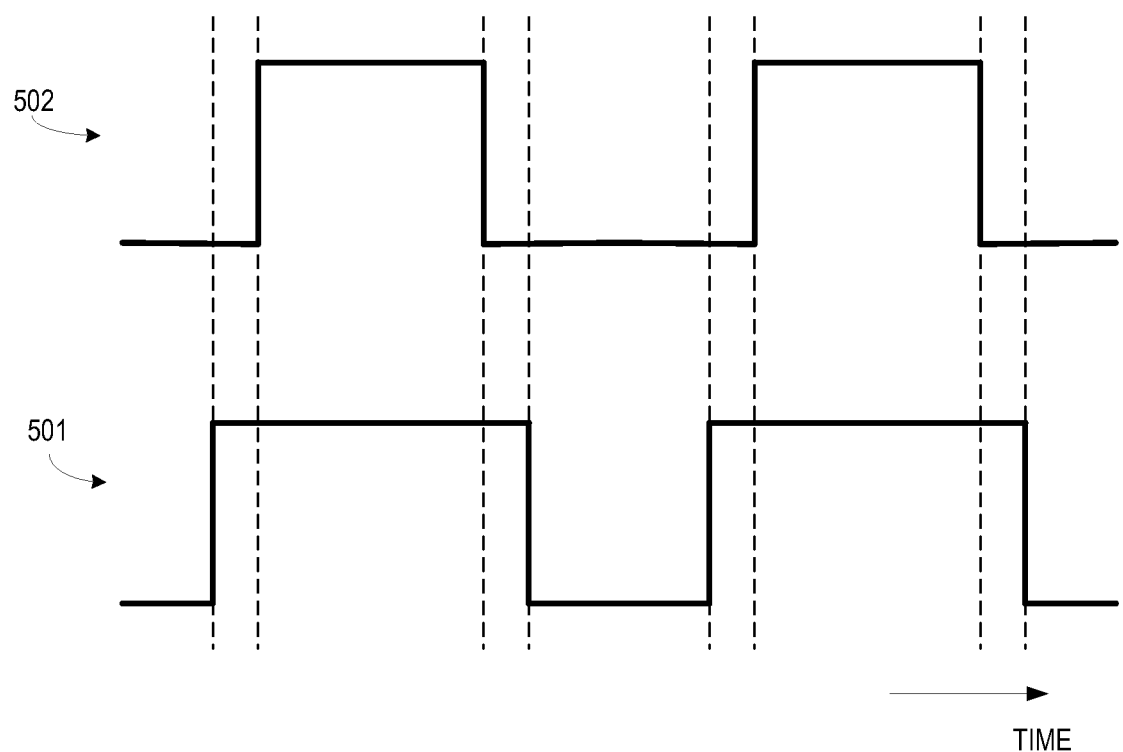
FIG. 5 illustrates generally example switch control waveforms for an example synchronous boost rectifier system.

FIG. 5 illustrates generally example switch control waveforms for a synchronous boost rectifier system. In an example, a synchronous boost rectifier system can include first and second power switches that can be switched in an alternating fashion with a non-overlapping time between the turn on of the device. For example, alternately switching the first and second switch in a non overlapping fashion can include switching the first switch to an open state before switching the second switch to a closed state. In an example, alternately switching the first and second switch in a non-overlapping fashion can include switching the first switch to a closed state before switching the second switch to an open state.

The illustrated waveforms of FIG. 5 show an example of a control signal 501 for a first power switch, such as the PMOS power switch 402 of the system 400 of FIG. 4, and an example of a control signal 502 for a second power switch, such as the NMOS power switch 403 of the system 400 of FIG. 4. In an example, first and second power switches of a synchronous boost rectifier system can switch in an alternating fashion with a non-overlapping time between a transition of each switch to prevent shoot-through currents. In an example, an output voltage $V_{OUT}$ can be boosted to a regulated voltage above a supply voltage $V_{IN}$ of the synchronous boost rectifier system. In some examples, the bulk of the first power switch, such as a PMOS transistor, can be tied to the output voltage $V_{OUT}$ during a synchronously rectified mode of operation of the converter system to prevent body diode conduction.

Figure 6:
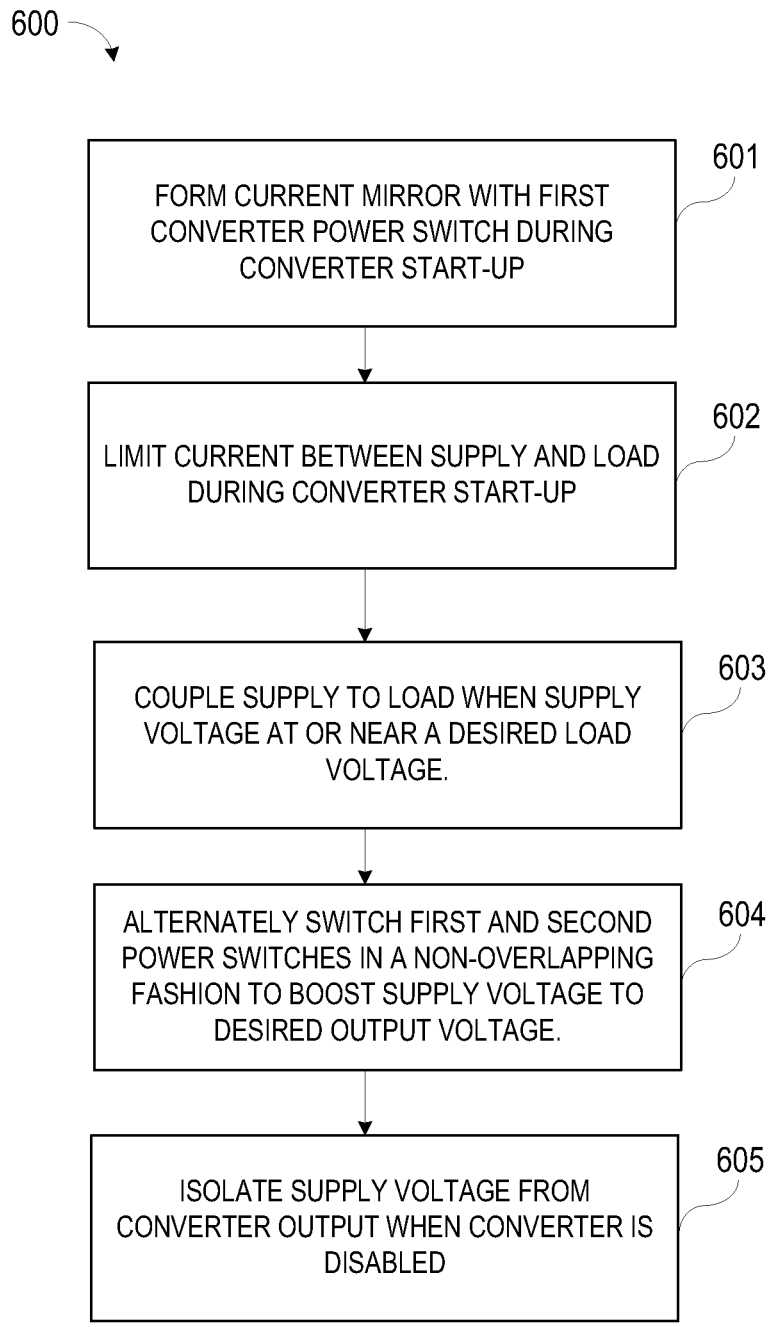
FIG. 6 illustrates generally an example method 600 of operating a synchronously rectified boost converter.

FIG. 6 illustrates generally an example method 600 of operating a synchronously rectified boost converter. In an example, a synchronously rectified boost converter can include first and second power switches coupled to an inductor. A controller can switch the first and second power switches to store energy from a supply in the inductor and then transfer the energy to a converter output. The energy can provide power to a load as well as regulate a desired output voltage.

In an example, at 601, a current mirror can be formed using a first converter power switch during start-up of the converter. The current mirror can include a third start-up transistor and a current source. At 602, during start-up, current can be limited between the supply and the load. During start-up, the output voltage can be significantly different than the supply voltage, such that when the supply is coupled to the load a significant amount of current can flow between the supply and the load. Limiting the start-up current can allow the converter to be fabricated using smaller, less expensive, components than those that might otherwise be required to handle the start-up conditions of a converter without start-up limiting.

At 603, the supply can be coupled to the load when the supply voltage is at or near the desired load voltage. In an example, coupling the supply to the load through the inductor can reduce converter losses because during a pass-thru mode the converter power switches are not switched. At 604, the method 600 can include alternately switching the first and second switches in a mom-overlapping fashion to boost the supply voltage to a desired output voltage. At 605, the method 600 can include isolating the supply voltage from the converter output when the converter is disabled. In an example, the bulk of a first converter power transistor, coupled between the converter output and the inductor, can be coupled to inductor to prevent body diode conduction of supply charge to the converter output.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, although the examples above have been described relating to PNP devices, one or more examples can be applicable to NPN devices. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method of operating a converter, the converter including an inductor configured to receive a supply voltage from a supply, a first switch configured to conduct current between a load and the inductor, and a second switch configured to initiate current in the inductor, the method comprising:
coupling the supply to the load using the first switch when the supply voltage is at or near a desired load voltage;
forming a current mirror using the first switch and a third switch, and limiting current between the supply and the load using the first switch and a current source coupled to the third switch when an output voltage is substantially less than the supply voltage; and
isolating the load from the inductor using the first switch when the converter is disabled.

2. The method of claim 1, wherein the coupling the supply to the load includes switching a first metal-oxide field effect transistor (MOSFET) to a closed state and a second MOSFET to an open state.

3. The method of claim 2, wherein the switching the first MOSFET to a closed state includes coupling a bulk of the first MOSFET to the load.

4. The method of claim 1, wherein the forming a current mirror using the first switch and a third switch includes coupling a bulk of the first MOSFET to the inductor to prevent body diode conduction to the load.

5. The method of claim 1, wherein the isolating the load from the inductor using the first switch includes isolating the load from the inductor using a first MOSFET.

6. The method of claim 5, wherein the isolating the load from the inductor using a first MOSFET includes coupling a bulk of the first MOSFET to the supply to prevent body diode conduction to the load.

7. The method of claim 1, including alternately switching the first and second switch to provide the desired load voltage when the converter is enabled and the desired load voltage is substantially higher than the supply voltage.

8. The method of claim 7, wherein alternately switching the first and second switch includes switching the first switch to a open state before switching the second switch to a closed state.

9. The method of claim 8, wherein alternately switching the first and second switch includes switching the second switch to an open state before switching the first switch to a closed state.

10. The method of claim 7, wherein the alternately switching includes coupling a bulk of the first switch to the load to prevent body diode conduction.

11. A converter comprising:
   a first switch configured to couple an inductor to a load;
   a second switch configured to initiate current flow in the inductor;
   a third switch coupled to a current source; and
   a controller configured to:
      switch the first and second switch to an open state to isolate the load from a supply voltage when the converter is disabled;
      switch the first switch to a closed state and switch the second switch to an open state when the supply voltage is near a desired load voltage; and
      couple the first switch to the third switch to form a current mirror, conduct current between the inductor and the load using the first switch, and control the conducted current using the current source when an output voltage is substantially less than the supply voltage.

12. The converter of claim 11, wherein the first switch includes a first MOSFET;
   the second switch includes a second MOSFET; and
   the third switch includes a third MOSFET.

13. The converter of claim 12, wherein, when the converter is enabled and the desired load voltage is substantially higher than the supply voltage, the controller is configured to alternately switch the first and second switch to provide the desired load voltage.

14. The converter of claim 13, wherein, when the converter is enabled and the desired load voltage is substantially higher than the supply voltage, the controller is configured to switch the second switch to a closed state after the first switch is in an open state.

15. The converter of claim 13, wherein, when the converter is enabled and the desired load voltage is substantially higher than the supply voltage, the controller is configured to switch the first switch to a closed state after the second switch is in an open state.

16. The converter of claim 13, wherein, when the converter is enabled and the desired load voltage is substantially higher than the supply voltage, the controller is configured to couple a bulk of the first switch to the load to prevent body diode conduction.

17. The converter of claim 11, wherein an integrated circuit chip includes the first second and third switches, and the controller.

18. The converter of claim 11, wherein the converter includes the inductor.

* * * * *